July 9, 1968 L. O'NEAL 3,391,503
ADJUSTABLE DOCK SEAL
Filed May 22, 1967 5 Sheets-Sheet 1
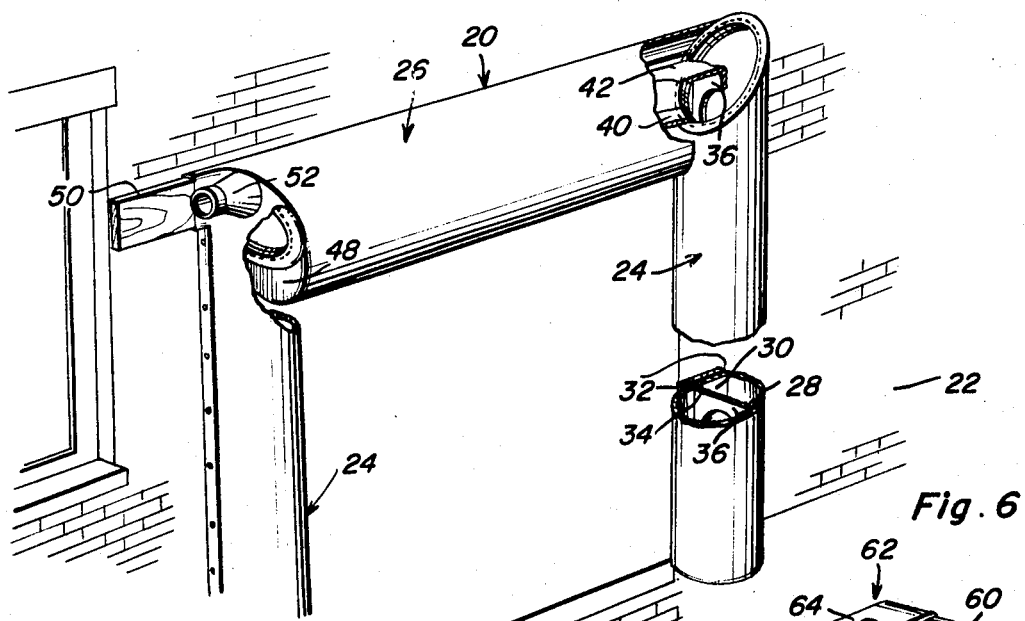
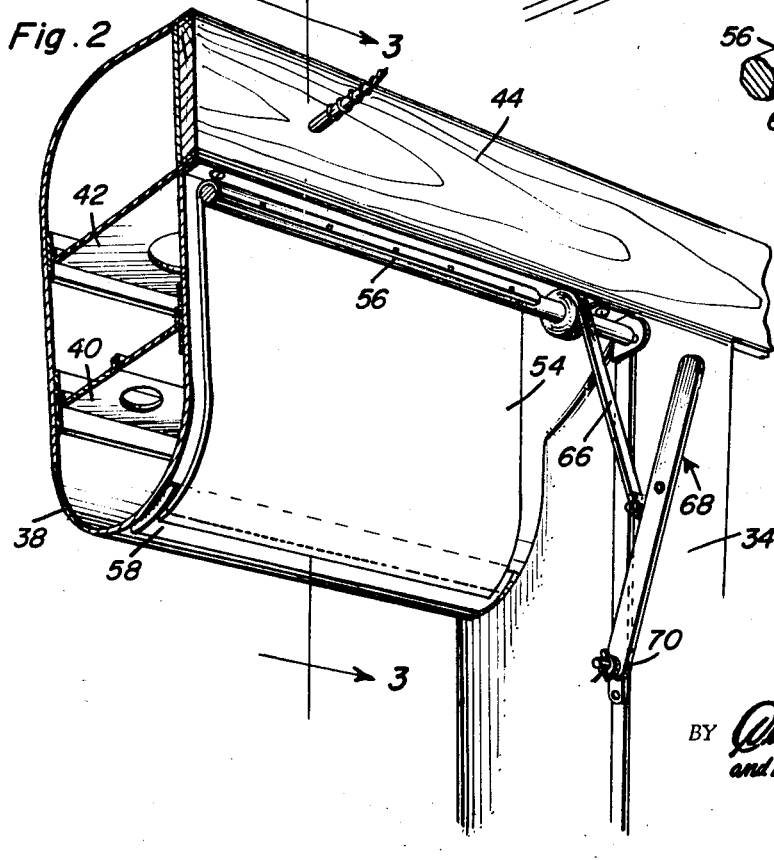
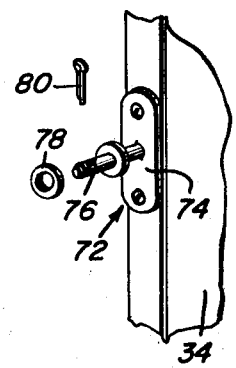
Larry O'Neal
INVENTOR.
BY *Clarence A. O'Brien*
*and Harvey B. Jacobson*
Attorneys

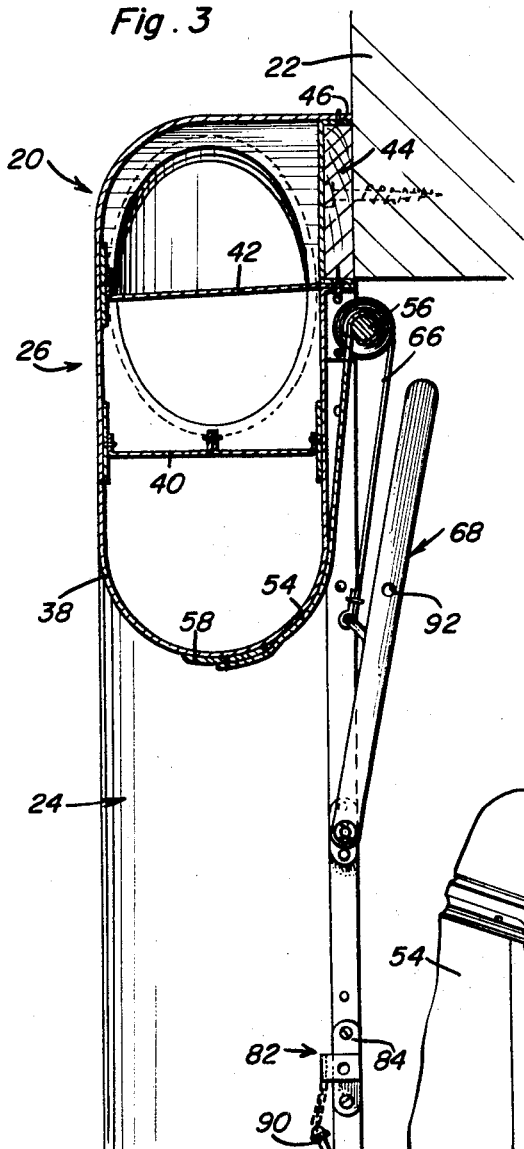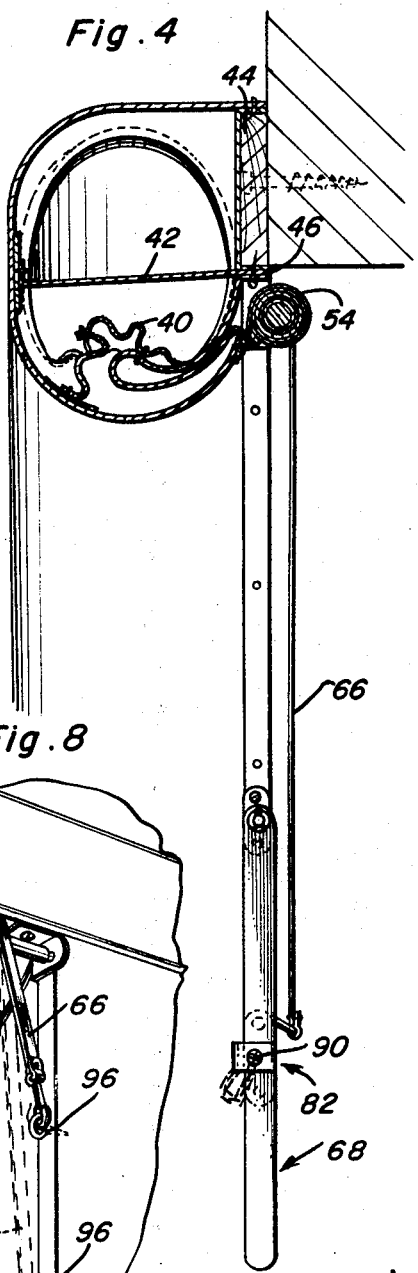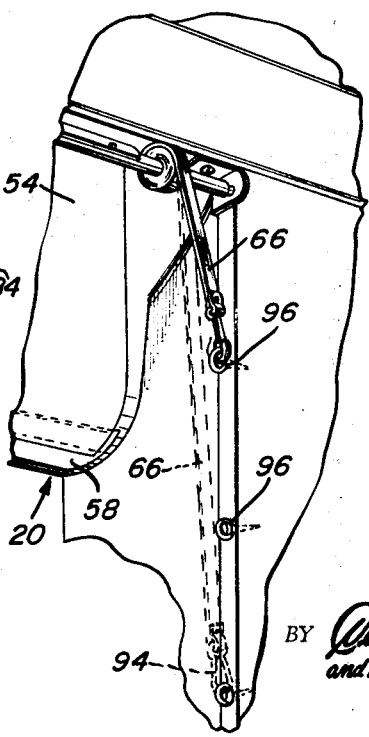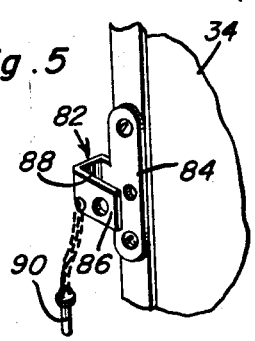
Larry O'Neal
INVENTOR.

Larry O'Neal
INVENTOR.

BY Clarence A. O'Brien
and Harvey B. Jacobson
Attorneys

July 9, 1968
L. O'NEAL
3,391,503
ADJUSTABLE DOCK SEAL
Filed May 22, 1967
5 Sheets-Sheet 4
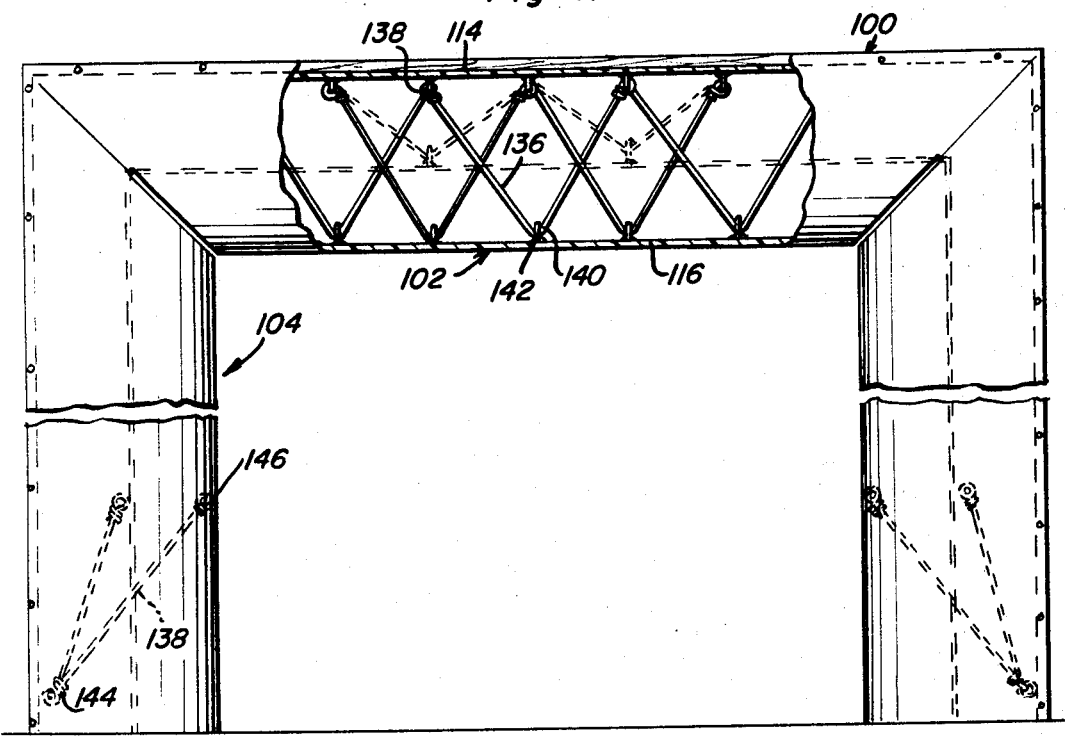
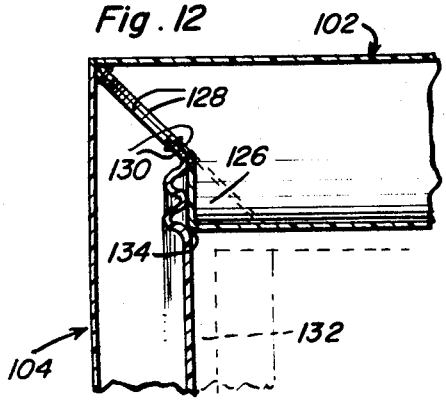
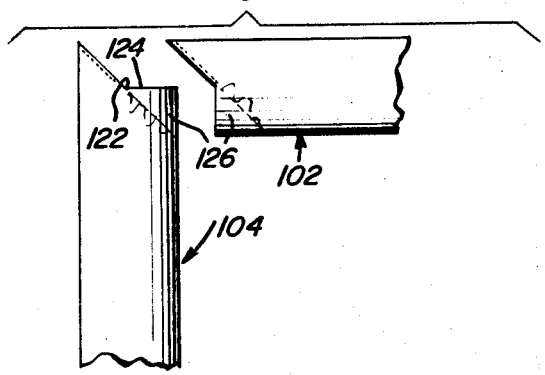
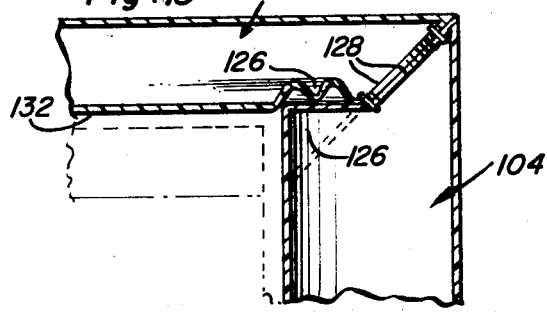
Larry O'Neal
INVENTOR.
BY

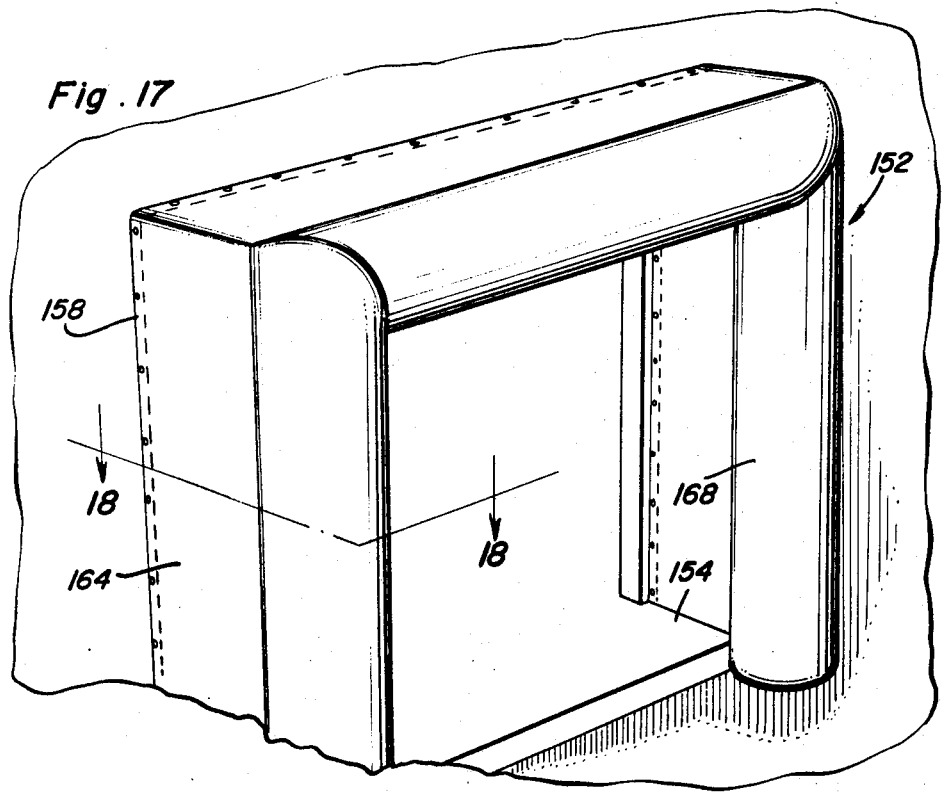
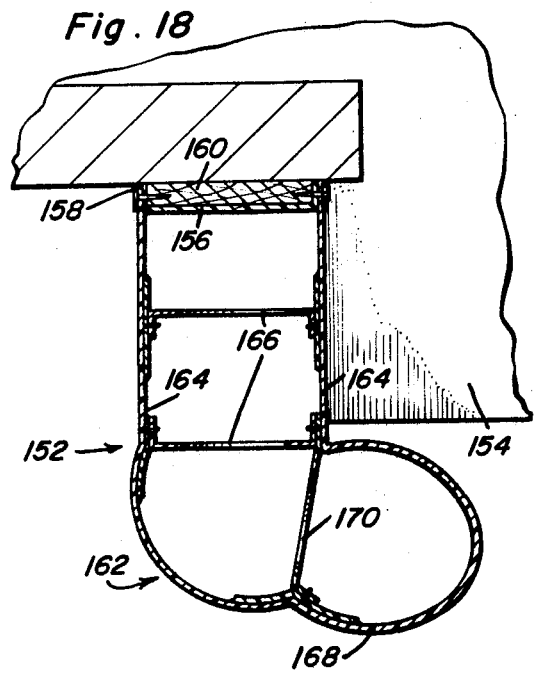
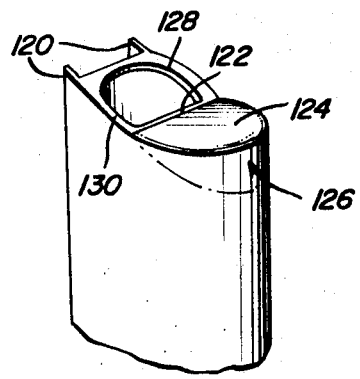

United States Patent Office 3,391,503
Patented July 9, 1968

3,391,503
ADJUSTABLE DOCK SEAL
Larry O'Neal, 549 W. Indianola Ave.,
Canfield, Ohio 44511
Continuation-in-part of application Ser. No. 567,103,
July 22, 1966. This application May 22, 1967, Ser.
No. 640,119
23 Claims. (Cl. 52—2)

ABSTRACT OF THE DISCLOSURE

An elongated inflatable tubular member affixed to a building wall along the two sides and top of a loading opening therethrough for selective inflation and expansion into sealed engagement with an adjacent vehicle. The three elongated sections which go into making up the inflatable member are so interrelated as to enable, through a selective collapsing thereof, a reduction in the size of the member for the accommodation of different size vehicles.

---

This is a continuation-in-part of application Ser. No. 567,103, filed July 22, 1966, for Dock Seal which is in turn a continuation-in-part of application Ser. No. 432,-359, filed Feb. 12, 1965, for Inflatable Dock Seal, now Patent No. 3,303,615, patented Feb. 14, 1967. Thus, the instant application is also a continuation-in-part of application Ser. No. 432,359.

The present invention is concerned with new and useful improvements in inflatable dock seals or covers of the type which can be selectively expanded between a building wall and an adjacent vehicle about the loading and unloading openings therein.

It is a primary object of the instant invention to provide an inflatable loading dock seal or cover which is capable of providing a substantially complete closure of the space between the building and the vehicle so as to effectively seal out drafts, inclement weather, dirt, fumes, etc. while allowing for a proper maintenance of interior temperature and pressure controls during any loading or unloading operation.

In conjunction with the above object, it is also a significant object of the instant invention to provide an inflatable dock seal or cover which is adjustable in nature so as to accommodate variations in the sizes of the vehicles to be loaded or unloaded.

Likewise, it is an important object of the instant invention to provide an inflatable dock cover which, when deflated, is capable of collapsing compactly against the building upon which it is mounted.

In addition, it is an object of the instant invention to provide a dock seal which, depending upon the particular form utilized, is engageable against the rear end of a truck about the opening therein, or with the sides and top of the truck adjacent the rear end thereof as the vehicle is positioned adjacent the building, and in alignment with the loading dock thereof.

Basically, the dock cover of the instant invention is in the nature of an elongated continuous inflatable generally tubular member which extends at least along the two opposed sides of a building opening and across the top thereof. The section which spans the top of the opening includes a longitudinal depending portion which can be selectively raised so as to accommodate different heights of vehicles. In addition, in one particular form of the dock cover, the two lateral side sections can be selectively collapsed so as to accommodate different width vehicles.

One other particular embodiment specifically disclosed herein allows an extended seal which projects a substantial distance outwardly from the building wall so as to accommodate the extended loading aprons on either the loading dock itself or on the truck bed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view, with portions broken away for purposes of illustration of the dock seal comprising the instant invention;

FIGURE 2 is an enlarged perspective detail taken from the interior of the mounted seal with the building wall itself removed;

FIGURE 3 is an enlarged cross-sectional detail taken substantially along the line 3—3 in FIGURE 2 with the adjustable top portion fully extended;

FIGURE 4 is a cross-section similar to FIGURE 3 with the collapsible top portion completely retracted or collapsed;

FIGURE 5 is a perspective detail of the keeper for the control handle;

FIGURE 6 is a perspective detail of the upper end of the retracting shaft;

FIGURE 7 is a perspective detail of the control handle mount;

FIGURE 8 is a perspective detail of a modified form of strap securing means for the retracting mechanism;

FIGURE 11 is a front elevational view, with a portion broken away for purposes of illustration, of the dock cover of FIGURE 9;

FIGURES 12 and 13 are cross-sectional details illustrating the collapsible or adjustable nature of the dock seal of FIGURE 9;

FIGURE 14 is an exploded partial elevational view of one side and the top section of the dock seal of FIGURE 9;

FIGURE 15 is a partial perspective view of the upper portion of one of the vertical sections;

FIGURE 17 is a perspective view of another modified form of dock seal; and

FIGURE 18 is an enlarged cross-sectional detail taken substantially along line 18—18 in FIGURE 17.

Figure 9:
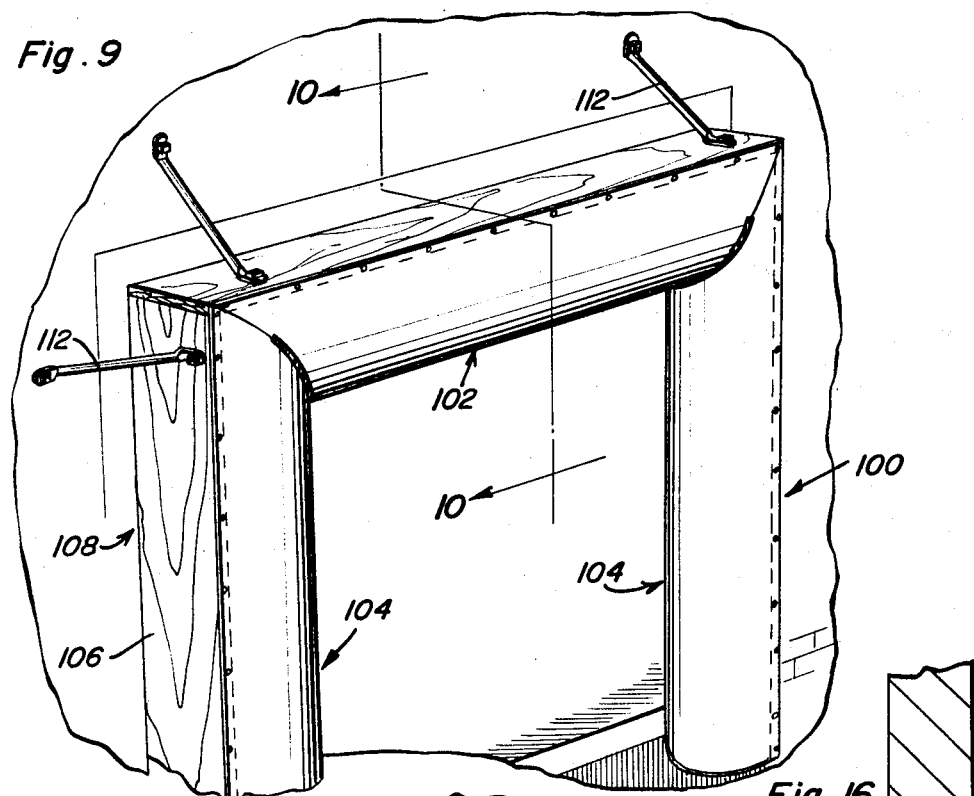
FIGURE 9 is a partial perspective view of a modified form of dock cover.

Referring now more specifically to the invention, reference numeral 20 is used to generally designate the dock seal comprising the instant invention. This dock seal 20, which is in the nature of an elongated inflatable generally tubular member, is mounted on the face of a building wall 22 about the loading dock for a selective expansion into sealing engagement with an adjacently positioned vehicle. The actual material of the cover 20 is of course to be air impervious in nature and capable of resisting tears or repeated damaging engagements with vehicles in contact therewith, neoprene coated nylon having been found to be a particularly desirable material.

The dock seal or cover is actually constructed in three communicating sections, two vertical sections 24 secured to the wall 22 adjacent the opposed vertical sides of the loading dock, and an overhead horizontal section 26 overlying the wall 22 immediately above the loading dock. The two vertical side sections 24 are constructed in the same manner as the vertical sections in application No. 567,103, and include, in each instance, a full length arcuate or substantially circular panel 28, a full length flat mounting panel 30 having the opposed edges thereof secured to the two longitudinal edges of the circular panel 28 so as to define a complete enclosure, and a pair of laterally directed mounting flanges 32 which are fastened directly to the side edges of a framing plank 34 secured to the wall 22 itself. The side sections 24 also each include a full length internal bulkhead or retaining panel 36 which effects a lateral bulging or deformation of the panel 28 inwardly toward the dock opening.

The horizontal top section 26 differs from the vertical side sections 24 in that the section 26 is of an appreciably greater depth, including what might be considered a substantially full length adjustable or collapsible lower portion 38. A full length transversely extending apertured bulkhead 40 separates the adjustable lower portion 38 from the main portion of the section 26 which in turn includes a second transverse apertured bulkhead 42 utilized in effecting a generally transverse bulging of the section 26 much in the manner of the side sections 24. With reference to FIGURES 2 and 3 in particular, it will be noted that the bulkheads 40 and 42 combine so as to present substantially flat inner and outer faces on the top cover section 26 which, also similar to the vertical section 24, is secured to a horizontal frame plank 44 by means of suitable fasteners driven through full length laterally projecting flanges 46 which overlie the opposed edges of the frame plank 44, this plank 44 of course being rigidly affixed to the wall 22 itself.

The main portion of the top section 26, that portion above the bulkhead 40, is of substantially the same depth as the side sections 44 and has the opposed ends thereof peripherally secured, at approximately a 45° angle, to the top ends of the corresponding side section 24 as will be best appreciated from FIGURE 1. These ends are of course secured in a manner which provides for a substantially full size opening between the sections, while retaining the air impervious nature of the sections, thus in effect providing for a continuous air chamber through the three sections. The adjustable lower portion 38, on the contrary, has opposed sealed ends 48 which lie closely adjacent the opposed vertical sections 24 immediately below the joined upper ends thereof, it being contemplated that this lower portion 38 be selectively upwardly collapsed, noting FIGURE 4, so as to adjust to various height trucks or the like. Incidentally, at this point it might be well to note that an appropriate relatively small blower (not illustrated) is to be associated with the dock seal or cover 20 so as to, when the dock seal 20 is in use, introduce a constant flow of low pressure air so as to maintain the inflation of the cover 20 while allowing for a flexing thereof through engagement there-against by the vehicle, and so as to allow for the above referred to adjustment or collapsing of the adjustable portion 38 while still maintaining the generally inflated nature of the cover. This blower can be located in any appropriate position, such as for example on the mounting panel 50 illustrated in FIGURE 1, and communicated with the interior of the cover 20 through a suitable sleeve 52 sealed to and projecting from the cover.

In order to effect the vertical adjustment of the adjustable lower portion 38 of the top section 26, an elongated flexible panel 54 has one edge portion thereof affixed to the lower arcuate face of the adjustable portion 38 and the opposite longitudinal edge portion thereof affixed to an elongated rotatably mounted rod or shaft 56 for a selective rolling of the panel 54 thereon. The panel 54 extends for substantially the full length of the adjustable portion 38 with the actual engagement of the lower edge portion thereof with the arcuate face of the portion 38 being effected by a stitching of the lower edge portion of the flap to a strip 58 of like material which is in turn glued to the portion 38, thereby avoiding the necessity of stitching directly to the portion 38 and providing undesirable stitching perforations therethrough. Incidentally, this particular manner of securing is also utilized with regard to the internal bulkheads 40 and 42. The winding rod 56 has the opposed ends thereof rotatably received within projecting apertured ears 60, each constituting an integral portion of a bracket 62 which in addition includes a horizontal flange 64 bolted or otherwise rigidly affixed just inward of the upper cover section 26 immediately adjacent the upper edge of the loading dock opening, and preferably directly to the lower edge of the horizontal frame plank 44 as illustrated in the drawings. In order to effect a selective rotation of the shaft or rod 56, and a winding of the flap 54 thereon so as to produce the desired vertical adjustment of the portion 38, an elongated control strap 66 has one end thereof affixed to the rod 56 adjacent one side of the dock opening and has a major portion of the length thereof wound about the rod 56 with the second end thereof affixed to the central portion of a control handle 68. The control handle 68 has a first end 70 thereof pivotally mounted, through bracket means 72, on the adjacent vertical edge of the dock opening, or more specifically, on the adjacent inner edge of the vertical frame plank 34, for a swinging movement between the upwardly extending position of FIGURES 2 and 3 to the depending position of FIGURE 4, this movement effecting, through an unwinding of the strap 66, a rotation of the shaft 56 in a manner so as to wind the flexible panel 54 thereon and effect an upward collapsing of the cover portion 38. The bracket 72 utilized to pivotally mount the handle 68 is detailed in FIGURE 7 and consists basically of a flat base 74, screw or bolt mounted, and a laterally projecting stub shaft 76 which rotatably receives the end 70 of the handle 68 and retains this end between a pair of washer-like elements 78 removably located by a suitable retaining cotter pin 80 or the like.

The constant low pressure present in the cover 20 is sufficient so as to maintain the adjustable portion 38 fully expanded, while at the same time allowing for a collapsing of this portion 38 as suggested in FIGURE 4, the cover inflating air being forced back through the blower itself. In order to maintain the portion 38 collapsed, a suitable keeper bracket 82 is provided for the reception of the downwardly directed control handle 68. This keeper bracket 82 includes a flat base 84 directly affixed to the side wall, or in the illustrated example the inner edge of the side framing plank 34, and an integral laterally spaced overlying flange 86 which provides a seat or pocket 88 for the reception of the handle 68. Once the handle 68 is received within the pocket 88, a retaining pin 90 is inserted through aligned holes in the flange 86 and base 84 so as to prevent a withdrawal of the control handle 68 such as would automatically result because of the constant pressure present in the cover section 26. Incidentally, it will be noted that the retaining pin 90 actually extends through an appropriate aperture 92 provided in the control handle 68 itself. It is contemplated that the section 26, when the lower adjustable portion 38 is completely collapsed as indicated in FIGURE 4, have an effective depth substantially equal to that of the side sections 24. It will of course be appreciated that the panel 54 and end strap 66 are wound upon the rotatable shaft 56 in opposite directions so as to enable a winding of the panel 54 in conjunction with an unwinding of the strap 66, and vice versa. Further, if it is deemed desirable that the portion 38 assume a partially collapsed position, various means can be utilized to releasably secure the control handle 68 in any location between the extreme position of FIGURES 3 and 4, for example, a removable retaining pin can engage through an appropriate aperture in the control handle 68, near the pivotally mounted end 70 thereof, and into a series of holes provided in the adjoining side face of the wall 22 which defines the side of the loading dock opening.

In addition, because of the easy manner in which the vertical height of the adjustable portion 38 can be manually controlled, this portion 38 can actually be collapsed, a truck positioned therebeneath, and the portion 38 released for automatic expansion into sealed engagement with the truck. In other words, by incorporating the vertically adjustable lower portion 38 as an inflatable extension of the horizontal section 26, the adaptability of the cover 20 to the accommodation of various height trucks has been enhanced substantially beyond that achieved through a reliance solely on the flexible nature of the cover itself and the low pressure inflation thereof, the primary purpose of which is to accommodate the force of a vehicle coming in contact therewith as the vehicle is positioned for a movement of supplies through the dock opening.

With further regard to the vertical adjustment of the adjustable portion 38, attention is directed to FIGURE 8 wherein the free end of the control or adjusting strap 66, rather than being secured to a control handle 68, has been provided with a guarded hook 94 for selective engagement with a vertical series of keepers 96, in the nature of eyebolts, affixed to the adjoining plank edge, or for that matter any adjacent portion of the building wall. In this manner, a rapid adjustment of the height of the portion 38 and a positive retention of the portion 38 in its adjusted position can be simply effected.

Referring now specifically to FIGURES 9–15, it will be noted that a modified form of dock seal 100 has been illustrated therein, this dock seal 100 including both an adjustable horizontal upper section 102 and a pair of opposed laterally adjustable vertical sections 104. The dock cover or seal 100 is mounted in a manner differing slightly from that of the cover 20 with the particular mounting of the cover 100 making it more adaptable for engagement with the sides of the truck or vehicle having the rear end thereof positioned immediately adjacent the loading dock opening. Basically, the planks 106 which define the mounting frame 108 for the cover 100 are positioned so as to project perpendicularly outward from the outer face 109 of the building wall 22. These planks 106 are positioned outward of the opening defining edges 110 and are rigidified by rigid angled braces 112 having one end thereof affixed to the wall 22 itself and the other end thereof affixed to the corresponding frame plank 106 adjacent its outer edge. It is contemplated that the opposed ends of the top plank 106 be rigidly affixed to the upper ends of the side planks 106 so as to further rigidify the mounting frame 108. Further, other appropriate securing members can be provided as needed for this purpose.

The cover 100 itself includes, with regard to each of the sections 102 and 104, a full length flat mounting panel 114 overlying the inner face of the corresponding frame plank 106 and an arcuate panel 116 secured to the flat mounting panel 114 and bowing outwardly therefrom so as to define a generally tubular configuration. A full length apertured bulkhead or shape retaining panel 118 is also provided interiorly within each section so as to retain each section against any substantial lateral bulging so as to provide generally flat inner and outer faces with the major expansion being perpendicularly inward toward the loading dock. Each of the sections 102 and 104 is, similar to the other forms of dock cover, provided with a pair of rearwardly directed mounting flaps or flanges 120. As will be best appreciated from FIGURE 10, while the outer one of the mounting flanges 120 is affixed to the outer edge of the mounting plank 106, the inner mounting flange 120 is inwardly bent and secured directly to the inner face of the plank 106. In effecting this mounting, the inner flange 120 is first secured and the cover then positioned over the plank 106 and the outer flange 120 secured.

Attention is particularly directed to FIGURES 12–15 wherein the joint construction between the top section 102 and each of the vertical sections 104 has been detailed, this joint construction and the unique construction of the individual sections, making possible an automatic adjustment of the cover 100 to variations in both width and height of the received vehicles while at the same time providing for a positive leak-proof seal therewith. The upper end of each of the vertical sections 104, as well as the opposed ends of the top section 102 define a substantially 45° angle inwardly from the outer ends to approximately a central point indicated by reference numeral 122 with the remainder of each projecting perpendicular to the longitudinal extent of the corresponding section so as to define a flat end portion 124. The particular nature of this construction will be best appreciated from the perspective view of FIGURE 15 wherein it will be noted that the flat closed end portion 124 forms what might be considered a right angular extension 126 of the corresponding section beyond the beveled end on the inner portion thereof. The outer portion of each of these section ends, that defined at the 45° angle, includes an enlarged aperture 128 therethrough surrounded by a securing flange 130. Each of the upper section ends is abutted against the corresponding side section end with the mounting flanges 130 in overlying relation to each other, these abutted flanges then being sealed to each other in an air impervious manner completely about the aligned apertures 128 as will be readily appreciated from the sectional details of FIGURES 12 and 13. When the sections 102 and 104 are secured in this manner, it will be appreciated that all three sections have the interior air receiving chambers thereof in direct communication with each other whereby a single low pressure blower will effect a simultaneous inflation of all of the sections of the cover 100. Further, upon an inflation of all of the sections 102 and 104, and assuming no introduction of external pressure such as would result from a truck engaging thereagainst, the sections, at the joined ends thereof, will assume approximately a 45° angle completely therethrough, the opposed extensions 126 tending to inflate equally, or conversely to collapse equally at an equalized point corresponding to the angle of the secured portions of the section ends. Incidentally, it will of course be appreciated that the abutting extensions 126 are not secured to each other, but rather, are in free abutting engagement.

This equalization of expansion of the adjoining extensions 126 will be noted in FIGURES 9 and 11, while FIGURE 14 illustrates two adjoining sections 102 and 104 prior to an air impervious joining of the angled upper portions thereof and a partial collapsing of the lower extension portions 126 thereof.

The significance of these independent collapsible extensions 126 will be appreciated from FIGURES 12 and 13. With reference to FIGURE 12 in particular, such illustrates the presence of a truck body 132 of a width so as to, upon being accommodated between the two vertical side sections 104, effect an inward crushing or collapsing of these side sections 104. Upon an inward collapsing of the corresponding side section 104, it will be noted that the adjoining top section extension 126 will expand and follow the collapsed side section 104 so as to retain a generally right angular relationship therewith, this being generally denoted by reference numeral 134. In this manner, a continuous seal is provided at the corner between the side and top of the truck or vehicle body 132. By the same token, inasmuch as the top and side sections 102 and 104 are, at the joints therebetween, interlocked or bonded together for only approximately one-half the depth thereof, this in itself will facilitate the positive inward collapsing of the corresponding sections without affecting the joint between the sections and while retaining a positive airflow permitting communication between the sections.

FIGURE 13 illustrates a generally like situation wherein the truck body 132 is of a greater than normal height, thereby collapsing the top section 102 with the end extension 126 of each of the side sections 104 expanding so as to retain their generally right angular relationship with the collapsed upper section 102, thereby effectively retaining a positive sealed relationship with the truck body 132.

In light of this ability of the sections 102 and 104 to laterally collapse upon engagement with a rigid object such as the body of an unloading vehicle, such sections are in effect automatically adjustable so as to accommodate different size vehicles, the low pressure nature of the introduced air also cooperating so as to provide for this automatic accommodation of the cover sections to the vehicle in a substantially sealed manner thereabout. Further, with regard to this particular form of the invention, in most instances the vehicle 132 will be backed into position prior to an inflation of the cover 100 in order that the cover sections 102 and 104 might inflate into engagement with the sides of the vehicle 132 about the loading and unloading rear end thereof with the sections 102 and 104 automatically accommodating themselves to the sides and top of the vehicle in a snug and seal defining manner regardless of variations in the width or height of the vehicle, of course within specific ranges.

Turning specifically to FIGURE 11, it will be noted that in order to effect a compact collapsing of the sections 102 and 104, various internal elongated elastic cords 136 and 138 are provided. The elastic cords 136 are utilized interiorly within the horizontal top section 102 and have the opposed ends 138 thereof fixed to the interior of the flat mounting panel 114 at longitudinally spaced points with the intermediate portion 140 thereof extending through a loop member 142 affixed to the inner surface of the remote arcuate face of the arcuate panel 116 at a point centrally between the two secured ends 138. A series of such cords 136 are provided along a substantial portion of the length of the top section 102. The elastic cords 138 are located in the lower portions of the side sections 104, at least one in each. Each cord 138 has a first end 144 thereof affixed to the corresponding mounting panel adjacent the lower end of the section 104 and the second end 146 affixed to the inner surface of the inwardly projecting arcuate face at an intermediate point along the height of the section 104. It will of course be appreciated that these elastic straps 136 and 138, while possessing sufficient elasticity so as to effect an inward collapsing of the sections 102 and 104 upon a turning off of the blower, do not interfere with the free expansion of the sections 102 and 104 under the contemplated relatively low pressure which will be continuously supplied when the cover is being used. The straps 136 of course operate so as to pull the upper section 102 upwardly so as to generally clear the loading dock opening, while the side cords 138 pull the collapsed side sections 104 laterally away from the dock opening so as to maintain the dock opening substantially free of obstructions, this being particularly desirable when positioning a vehicle with the interior thereof in communication with the loading dock. Incidentally, utilizing the dock cover or seal 100, it will be appreciated that an exact centering of the vehicle is not necessary in that one side section 104 can expand a greater amount than the other in light of the manner in which the inner longitudinal portions of all three sections are laterally collapsible while retaining a substantially right angular relationship between the sections at the joining ends thereof.

Figure 16:
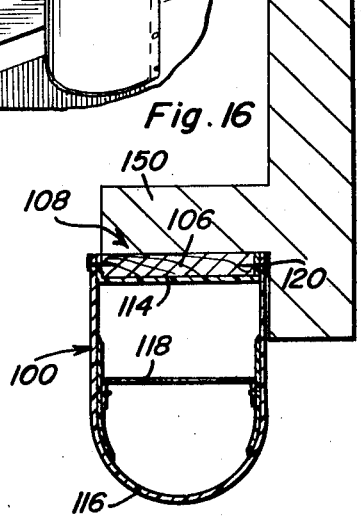
FIGURE 16 is a cross-sectional view, generally similar to FIGURE 10, illustrating a modified manner of mounting the dock seal.
Figure 10:
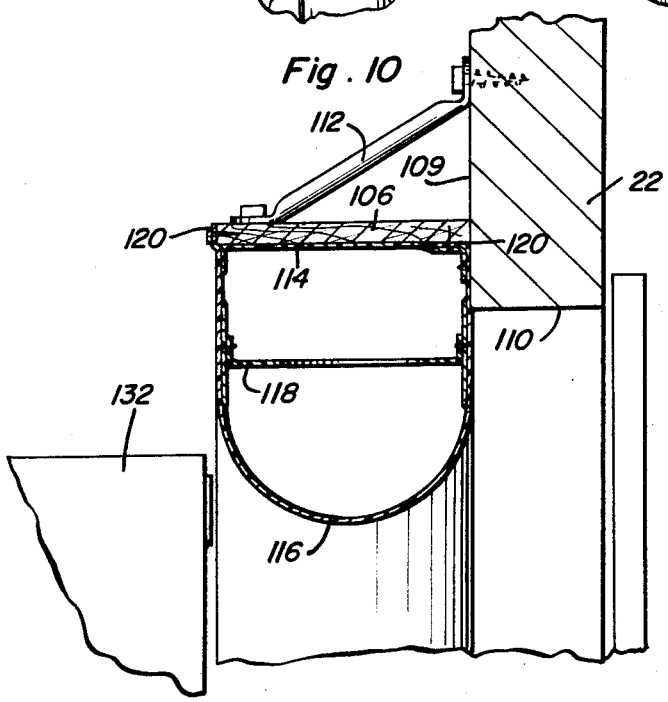
FIGURE 10 is an enlarged cross-sectional view taken substantially on a plane passing along line 10—10 in FIGURE 9.

Turning now to FIGURE 16, it will be noted that the cover 100 and associated mounting frame 108 are also particularly adapted for use in conjunction with loading docks wherein the loading dock includes a permanent projecting wall portion 150 thereabout so as to define a weather shield. In this situation, both mounting flaps or flanges 120 will be affixed to the opposite longitudinal edges of the mounting plank 106 which will in turn be affixed directly against the inner face of the shield or wall portion 150.

Attention is now directed to FIGURES 17 and 18 wherein a final form of inflatable dock seal to be described has been illustrated. This form of cover, generally indicated by reference numeral 152, is particularly adapted so as to enable the accommodation of either a loading dock apron or a truck apron and still engage against the sides or end portion of a vehicle. In other words, the apron will project outwardly from the building wall or truck to preclude any actual movement of the truck sufficiently close to the opening so as to be accommodated by, as an example, the dock seal of FIGURE 1. Accordingly, the dock cover 152 is so defined as to project a substantial distance outwardly from the building wall prior to being directed laterally inward for engagement with the truck.

The dock cover or seal 152, in addition to the flat mounting panel 156 and rearwardly directed mounting flanges 158 which engage and are secured to the opposite longitudinal edges of a framing plank 160, includes a full length forwardly projecting area defining panel 162. The panel 162 itself includes a pair of laterally spaced generally parallel walls 164 for projecting forwardly from the frame plank 160 for a distance contemplated to project slightly beyond the particular apron 154 involved. The panel walls 164 are maintained parallel through the utilization of a pair of internal apertured bulkheads or flexible retaining panels 166. Immediately forward of the outer edge of the apron, the two panel walls 164 terminate in a generally bulbous or arcuate panel portion 168 which, through the apertured bulkhead 170, has a substantial section thereof projected laterally inward across the truck receiving opening. This bulkhead 170 is secured to the leading edge of the inner panel wall 164 and is engaged with what would approximately be the leading portion of the arcuate portion 168 in a manner so as to inwardly draw this central portion so as to achieve the desired lateral bulging for flexible engagement with a received vehicle body. In order to effect this, it will of course be appreciated that the bulkhead 170 is relatively narrow as compared to the depth of the arcuate portion 168 forward of the outermost bulkhead 166.

While not specifically illustrated, it should be appreciated that the inwardly bulged portions of the cover 152 can constitute collapsible chambers in the manner detailed supra with regard to the modification of FIGURES 9–16. Further, various types of elastic suspension straps will also in all probability be utilized with the cover 152 so as to allow for a compact collapsing of the cover against the building during periods of non-use.

From the foregoing, it will be appreciated that significant improvements in dock covers or seals have been set forth, such improvements being particularly directed to the accommodation of a variety of situations, including different height and width vehicles and the presence of the loading apron, either on the loading dock or the vehicle itself. The cover itself is mountable upon the face of a building, such as for example a warehouse, in surrounding relation to a loading dock, and is selectively inflatable, utilizing a relatively low pressure for sealing engagement between the building and an adjacent vehicle during loading operations. In each instance, the dock cover is so mounted as to project inwardly toward or across a portion of the dock opening for engagement with a positioned vehicle, this inward projection of at least a portion of the dock cover being effected through either the utilization of at least one transverse bulkhead so as to effect an inward bulging of the dock cover or through the utilization of a mounting frame projecting perpendicularly outward from the wall whereby the seal, positioned on the mounting frame, can project generally parallel to the surface of the wall and inwardly across the edge portion of the dock opening. Incidentally, while not specifically noted supra, it should of course be appreciated that the dock seal can also be extended so as to underlie the dock opening should such be deemed necessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A wall having an opening defined through one face thereof, an elongated inflatable dock cover extending about a major portion of the border of said opening, said cover comprising an elongated hollow generally tubular member, means engaging said cover along the full length thereof and mounting said cover on said wall adjacent said opening, and flexible means positioned within said member and orientated transversely thereacross in a plane generally outward from the plane of the wall face, said flexible means having the opposite extremities thereof secured to the opposite portions of said member so as to limit the inflated expansion of said member perpendicular to said wall face and encourage an inflation produced expansion of said member toward said opening.

2. A wall having an opening defined through one face thereof, an elongated inflatable seal mounted on said wall and extending about a major portion of the border of said opening, said seal including opposed vertical sections positioned adjacent the sides of said opening, and a horizontal top section positioned adjacent the top of said opening, at least one of said sections having a full length outer portion therealong projecting across the adjoining opening border toward said opening, said projecting portion being selectively retractable along the full length thereof while generally retaining the corresponding section in an inflated state.

3. The structure of claim 2 wherein said retractable full length portion is associated with the top section, and means for effecting a selected retraction of the portion and retaining the portion in a selected retracted position.

4. The structure of claim 3 wherein said means for effecting a selected retraction of the portion does so by an upward collapsing of the portion against the inflating pressure within the top section.

5. The structure of claim 4 wherein the means for effecting a retraction of the portion includes an elongated shaft rotatably mounted parallel to the collapsible upper section portion at a raised elevation relative thereto, a flexible panel secured to the collapsible portion along the lower extent thereof and extending therefrom into fixed engagement with said shaft for a selective winding of the flexible panel on said shaft in response to a rotation of said shaft and a corresponding upward drawing of the collapsible portion, and means for selectively effecting a rotation of said shaft.

6. The structure of claim 5 wherein the means for rotating said shaft comprises a flexible strap wound about an end portion of said shaft in the opposite direction from that of the flexible panel whereby a pull on said strap will effect a panel winding rotation of said shaft and a release of said strap will effect, through the inflation pressure within said top section, an unwinding of said panel and a winding of said strap on said shaft, and means for releasably affixing said strap in at least one position for maintaining said shaft against rotation.

7. The structure of claim 2 wherein all three sections include full length retractable portions extending inwardly toward the opening beyond the associated opening border.

8. The structure of claim 7 wherein the portion associated with the top section has the opposite ends thereof sealed and in abutting engagement with the adjacent upper ends of the vertical section portions, said abutting adjacent ends being, in the absence of a retraction of any of the sections, mutually collapsed so as to define an angle of approximately forty-five degrees therebetween and a corresponding right angular corner between the outer faces of the adjacent portions, each of said portion ends being selectively expandable, through the internal inflating pressure, upon a retraction of the portion associated wtih the adjacent section in a manner so as to maintain the right angle corner between the adjacent portion faces.

9. The structure of claim 8 including mounting means comprising a mounting frame rigid with said wall and projecting perpendicularly outward therefrom so as to define a face directed laterally toward said wall opening, said sections being secured to said frame face and projecting perpendicularly therefrom toward said opening.

10. A dock cover mountable about a loading dock opening within a wall, said dock cover including a pair of laterally spaced vertical side sections and a horizontal top section extending between said side sections adjacent the upper ends thereof, said top section being vertically adjustable between and independent of said side sections so as to vary the effective height of the dock cover while maintaining a predetermined width between the side sections, and means for effecting an independent vertical adjustment of said top section.

11. The structure of claim 10 wherein said cover is of an inflatable flexible air impervious material, said sections being in airflow permitting communication with each other so as to enable the utilization of a single source of inflation producing pressurized air.

12. A dock cover mountable about a loading dock opening within a wall, said dock cover including a pair of laterally spaced vertical side sections and a horizontal top section extending between said side sections adjacent the upper ends thereof, said top section being vertically adjustable between said side sections so as to vary the effective height of the dock cover, and means for effecting a vertical adjustment of said top section, said cover being of an inflatable flexible air impervious material, said sections being in airflow permitting communication with each other so as to enable the utilization of a single source of inflation producing pressurized air, said vertically adjustable top section including a collapsible full length inflatable lower portion, said means for vertically adjusting said top section doing so by selectively collapsing said lower portion.

13. The structure of claim 12 wherein said means for vertically adjusting said top section comprises an elongated rotatably mountable shaft positionable above said collapsible lower portion, flexible means engaged between the lower portion and the shaft for a selective winding on said shaft upon rotation of said shaft and a corresponding upward drawing of the lower portion and means for effecting a selective rotation of said shaft.

14. An inflatable dock cover including a pair of opposed vertical side sections and a horizontal top section extending between the upper extremities of said vertical side sections, said dock cover being mountable about a loading dock opening for sealing engagement with a vehicle positioned adjacent thereto, each of said sections being defined by adjacent longitudinal inner and outer portions forming a common internal air chamber, the opposed ends of the inner portion of the top section being secured to the upper end of the inner portion of each adjacent vertical section in an air flow permitting manner for the movement of air therebetween, the opposite ends of each outer portion being independently sealed and free of any other outer portion ends adjacent thereto for independent movement.

15. A structure of claim 14 wherein each of said outer section portions are selectively collapsible laterally toward the adjacent inner portion.

16. The structure of claim 15 wherein the free sealed ends of the outer portion of the top section abut the upper free sealed ends of the vertical sections at approximately a 45° angle so as to define a right angle corner between the outer faces of the adjacent outer portions, each of these abutted sealed ends being selectively extensible upon a collapsing of the outer portion associated with the adjacent end so as to effect a general retention of the right angular corner relationship between the adjacent outer portion faces.

17. The structure of claim 16 including a rigid mounting frame, said mounting frame including a planar face orientatable in a plane perpendicular to that of the loading dock opening laterally thereof, said dock cover including, as a part of the inner portion of each section, a flat mounting panel overlying the frame face, and means affixing the cover to the frame.

18. The structure of claim 16 wherein the inner portion of each section is mountable so as to project perpendicularly outward from the plane of the dock opening, the outer portion associated with each section extending laterally therefrom toward said opening.

19. The structure of claim 1 wherein said cover initially extends perpendicularly outward from said wall and subsequently terminates in the portion directed inwardly toward said opening across the border thereof.

20. The structure of claim 1 including elastic retracting strap means mounted internally within said member for effecting a compact collapsing thereof.

21. The structure of claim 10 wherein said vertically adjustable top section includes a collapsible full length inflatable lower portion, said means for vertically adjusting said top section doing so by selectively collapsing said lower portion.

22. A wall having an opening defined through one face thereof, an elongated inflatable dock cover extending about a substantial portion of the border of said opening, said cover comprising an elongated hollow member, means mounting said cover on said wall adjacent said opening, and flexible means positioned within said member and orientated transversely thereacross in a plane generally outward from the plane of the wall face, said flexible means having the opposite extremities thereof secured to the opposite portions of said member so as to limit the inflated expansion of said member perpendicular to said wall face and encourage an inflation produced expansion of said member toward said opening.

23. For engagement with a wall about an opening defined therein, an elongated inflatable dock cover of a length so as to extend about a substantial portion of the border of an associated opening, said cover comprising an elongated inflatable hollow flexible member, means on said cover for mounting said cover on an adjacent wall, flexible means positioned within and extending longitudinally along said member and orientated transversely thereacross, and means securing the transversely opposed edges of said flexible means to opposed portions of the hollow member so as to limit the inflated expansion of said member in the plane of the flexible means and encourage an inflation produced expansion of said member laterally of the flexible means.

References Cited

UNITED STATES PATENTS 2,939,467   6/1960   Meyer et al. _____ 52—2

REINALDO P. MACHADO, *Primary Examiner.*